Figure 1:
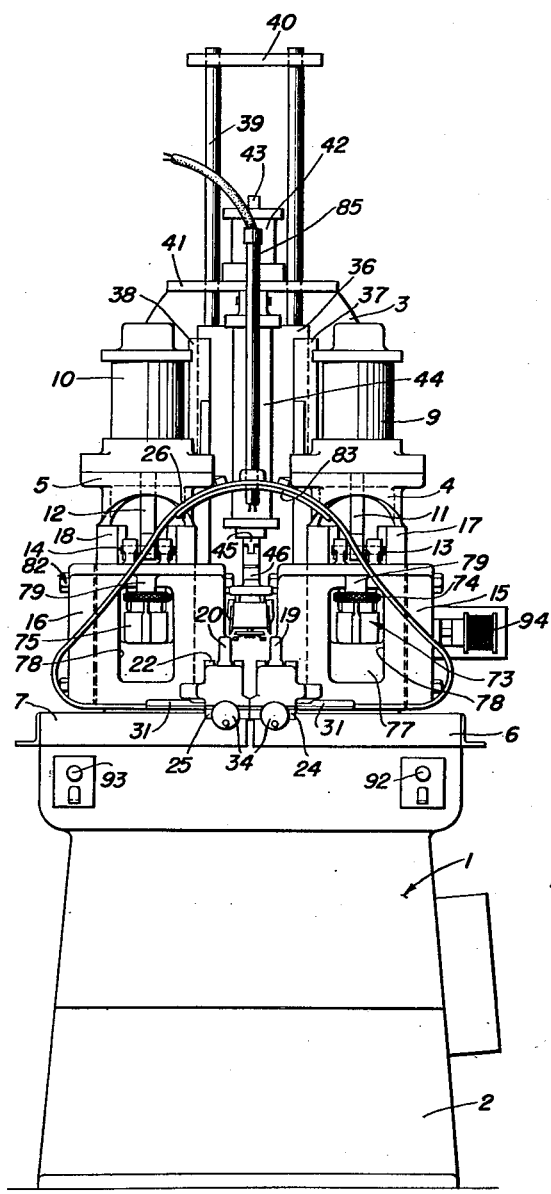

Feb. 13, 1951     E. D. GEORGE     2,541,696
TUBE SPLICING APPARATUS

Filed Nov. 12, 1948     5 Sheets—Sheet 1

*INVENTOR.*
EVERETT D. GEORGE
BY
ATTORNEY

Feb. 13, 1951 E. D. GEORGE 2,541,696
TUBE SPLICING APPARATUS
Filed Nov. 12, 1948 5 Sheets-Sheet 2

INVENTOR.
EVERETT D. GEORGE
BY
ATTORNEY

Feb. 13, 1951 E. D. GEORGE 2,541,696
TUBE SPLICING APPARATUS
Filed Nov. 12, 1948 5 Sheets-Sheet 3

INVENTOR.
EVERETT D. GEORGE
BY
ATTORNEY

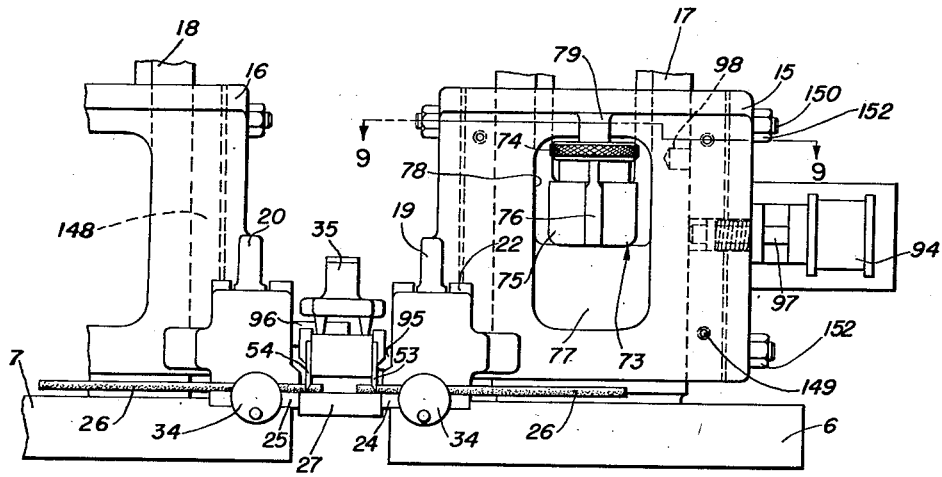

Feb. 13, 1951  E. D. GEORGE  2,541,696
TUBE SPLICING APPARATUS
Filed Nov. 12, 1948   5 Sheets-Sheet 5

INVENTOR.
EVERETT D. GEORGE
BY
ATTORNEY

Patented Feb. 13, 1951

2,541,696

UNITED STATES PATENT OFFICE 2,541,696

TUBE SPLICING APPARATUS

Everett D. George, Cuyahoga Falls, Ohio, assignor to Wingfoot Corporation, Akron, Ohio, a corporation of Delaware Application November 12, 1948, Serial No. 59,647

16 Claims. (Cl. 154—9)

1

The present invention relates to an improved form of apparatus for splicing the ends of rubber or plastic articles of indeterminate lengths to form endless bands or tubes. More particularly, the invention is concerned with improved means for joining the ends of unvulcanized inner tube stock, tread stock, and the like.

The improvements of the present invention are particularly advantageously adapted to be employed in splicing apparatus generally of the type shown and described in the Haase Patent 2,024,577 directed to the apparatus and Patent 2,024,578 disclosing the method. The same general principles of operation and substantially the same construction of the apparatus are employed in splicing of both tread stock and tube stock. The method and apparatus of the aforementioned patents have been quite extensively used and have enjoyed marked commercial success.

More recently, with the development of synthetic rubber and various related classes of plastics, it has been found that the original Haase apparatus has a tendency to impart certain detrimental effects to the stock in the course of its manipulation. Some of these defects have been traced to distinct differences in the physical and physico-chemical characteristics of the synthetic materials over those of natural rubber previously employed exclusively in the manufacture of inner tubes, tread stock, and the like. The new materials require much greater care in handling and processing to avoid the production of large quantities of rejected or inferior products.

It is an object of the present invention to correct these difficulties, thereby facilitating the production of considerable numbers of high quality products irrespective of the nature of the raw material employed.

It is a further object of the present invention to provide in splicing apparatus certain means which will facilitate adjustability of the several elements of the apparatus to obviate the necessity of frequent replacement of parts and will render the operation of the apparatus highly flexible.

It is a still further object of the present invention to provide in splicing apparatus several alternate forms of guide means for positioning the ends of the stock which is to be cut and spliced in proper alignment and to insure a positive clamping action thereon.

Other objects and advantages of the present invention will be readily understood as the description of a preferred form of splicing apparatus illustrated in detail in the accompanying drawings proceeds.

2

Figure 2:
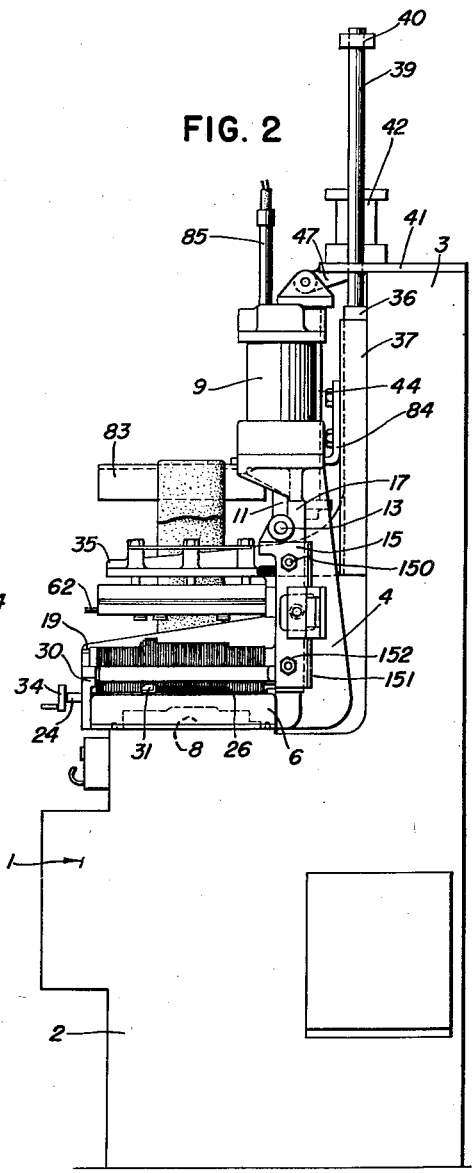
Figure 3:
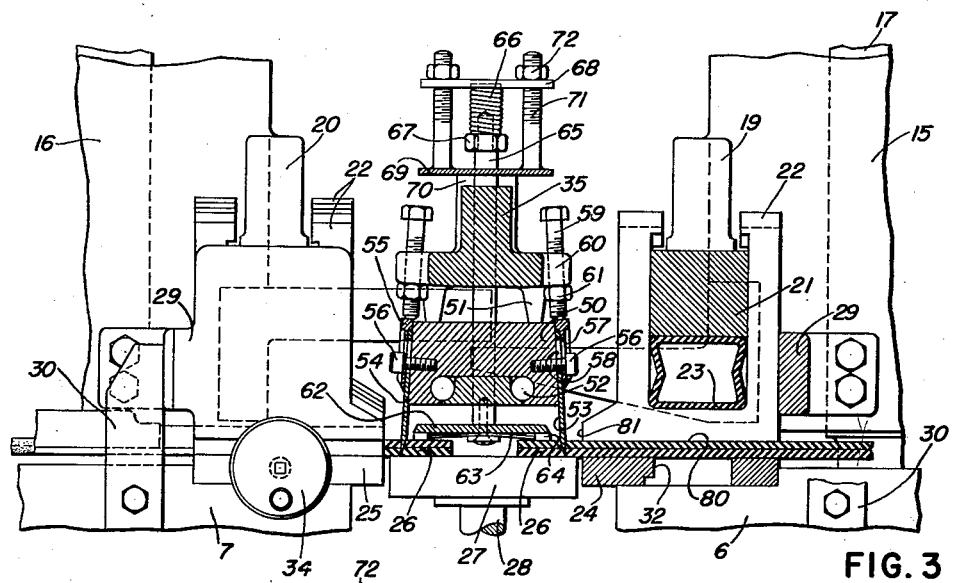
Figure 4:
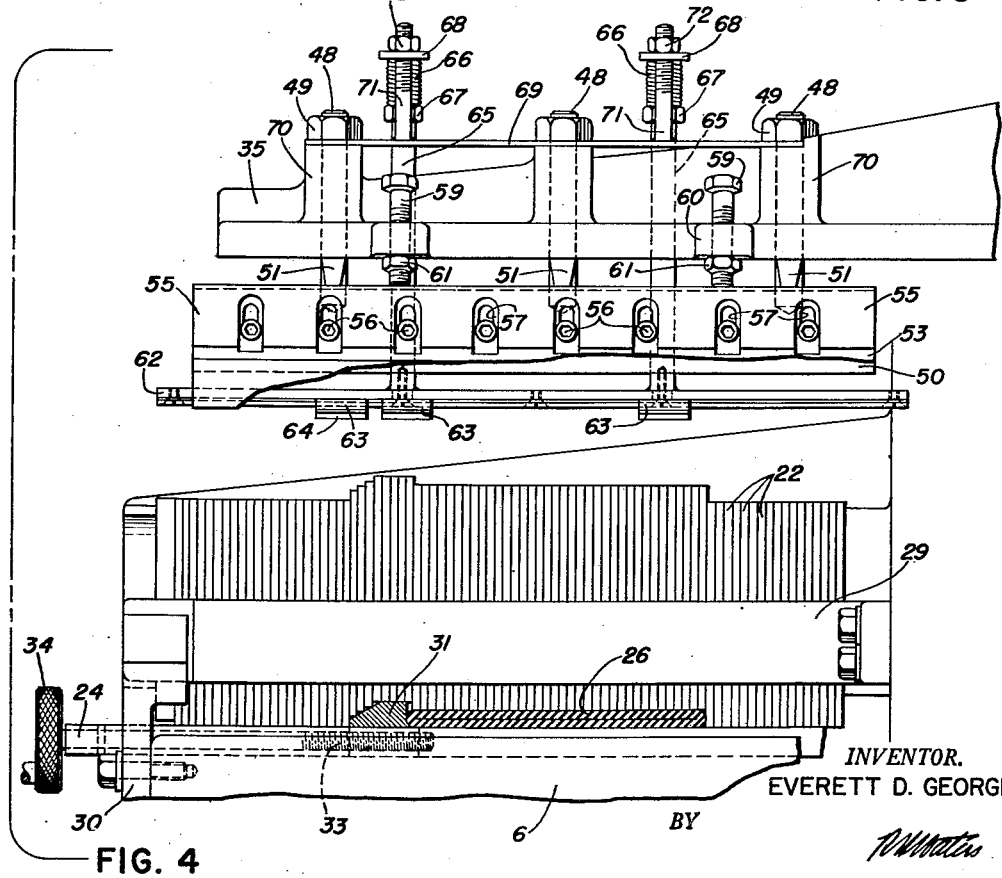

In the drawings, Fig. 1 is a front elevation of a typical splicing apparatus with which the teachings of the present invention are advantageously adapted to be employed. Fig. 2 is a side elevation of the apparatus of Fig. 1. Fig. 3 is an enlarged front view of a portion of the apparatus of Figs. 1 and 2 with the elements thereof disposed in cutting relation and having parts in section and broken away. Fig. 4 is an enlarged side elevation of the portion of the apparatus illustrated in Fig. 3 with parts in section and broken away, but with the cutting elements shown in a raised position. Figs. 5, 6, 7, and 8 are partial front elevations corresponding generally to Fig. 3 and showing the elements of the apparatus in various stages of operation. Fig. 9 represents a horizontal cross section taken along the line 9—9 in Fig. 7.

Figure 10:
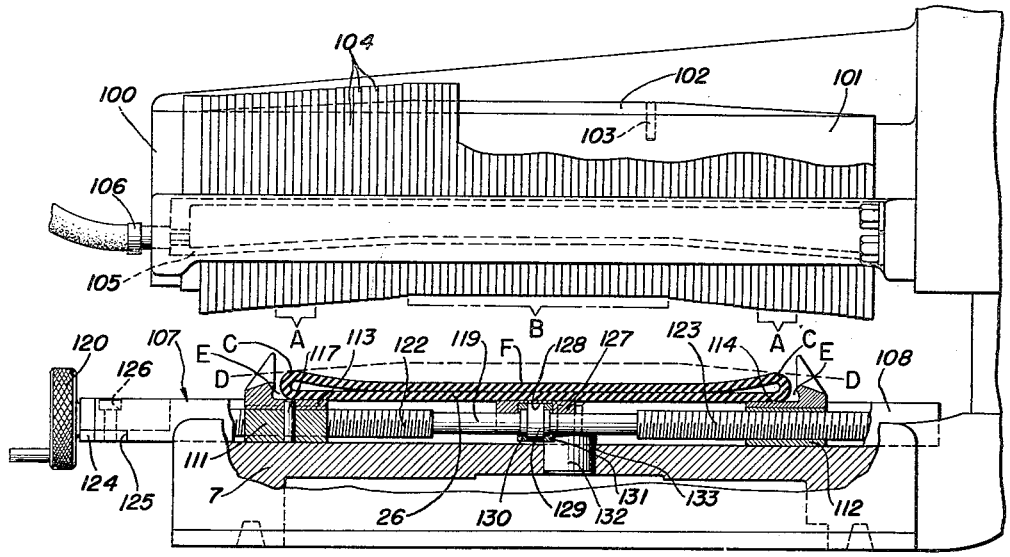
Figure 11:
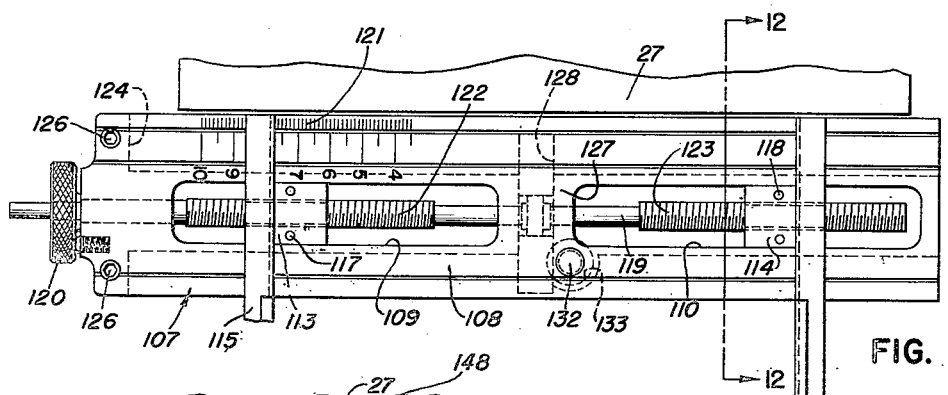
Figures 12, 13:
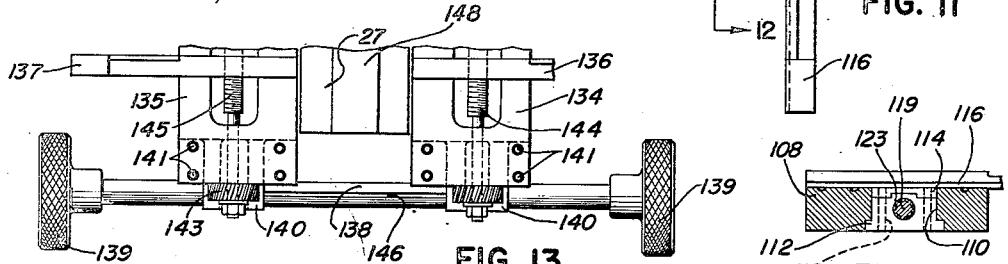
Figure 14:
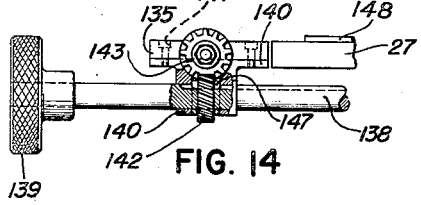

Fig. 10 is a partial side elevation corresponding generally to Fig. 4 illustrating an alternate construction of certain elements of the apparatus. Fig. 11 is a plan view of a portion of the alternate form of apparatus illustrated in Fig. 10. Fig. 12 is a vertical cross section taken along the line 12—12 in Fig. 11. Fig. 13 is a partial plan view of still another embodiment of the inventive concept of the instant application corresponding generally to Fig. 11. Fig. 14 is a partial front elevation of the apparatus of Fig. 13 with parts broken away.

In the preferred embodiment of the invention illustrated in Figs. 1 and 2 of the drawings, the splicing apparatus indicated generally by the reference numeral 1 comprises a frame structure which embodies a base portion 2 and an upright portion 3. Directly in front of the upright portion 3 of the frame structure is disposed a pair of vertical supports 4, 5 which are secured to or form part of carriages 6, 7 which are supported on the bed 8 of the base portion 2 of the frame structure for slidable movement in a horizontal plane. The carriage means or carriages 6 and 7 are adapted to be moved on the bed 8 toward and away from each other during the actuation of the apparatus in a manner to be described in detail hereinafter.

On the uppermost ends of the vertical supports 4 and 5 are disposed the pressure cylinders 9 and 10, respectively. The pressure cylinders 9 and 10 are provided with piston rods 11 and 12, respectively, which are, in turn, connected through suitable linkages 13, 14 to the slide members 15 and 16. The slide members 15 and 16 are mounted for slidable movement in a vertical plane upon machine slides 17 and 18, respectively, formed on the vertical supports 4 and 5. The manner of mounting slide members 15 and 16 on machine slides 17 and 18 will be described in detail hereinafter. Thus, the actuation of the pressure cylinders 9 and 10 serves to move the slide members 15 and 16 in a vertical path along the machine slides 17 and 18.

On the slide members 15 and 16 are mounted the clamp arms 19 and 20, respectively. The arms 19 and 20 extend outwardly from the face of the slide members 15 and 16 in a direction at right angles to the faces thereof and are substantially coextensive in length with the over-all width of the carriages 6 and 7, respectively, with which they are associated.

As will be seen from Fig. 3 of the drawings, the arm 19 is provided with an enlarged portion 21 at the base thereof which serves to support a plurality of segments 22 of generally U-shaped configuration disposed in face-to-face relation horizontally of the projecting arm 19 with which they cooperate to form a compressing means as will best be observed from Fig. 4. The several segments 22 are highly flexible as a unit and are, therefore, capable of being adjusted in a vertical plane with respect to the enlarged portion 21 of the arm 19 by the action of an inflatable airbag 23 which is disposed longitudinally of the arm 19 beneath the enlarged portion 21 thereof and in contact with the bight of the generally U-shaped segments 22.

Thus, as inflation pressure is applied internally of the airbag 23, the several segments 22 will be forced downwardly into contact with the uppermost surface of the guide member 24 or any object which may be disposed thereon in the manner indicated in Fig. 4. A very positive clamping action is thereby achieved with the arm 19 disposed in its lowermost position and with pressure being exerted upon the segments 22 thereof by the inflation of the airbag 23. The arm 19 and the segments 22 serve to hold an object on the guide 24 in position for a series of operations which may be desired to be performed thereon.

An identical construction to that described with respect to the arm 19 is found in the case of the arm 20 on which the several segments 22 are adapted to be brought into adjustable contact with the surface of the guide member 25 supported by the carriage 7. In the case of a splicing operation involving an inner tube, the clamp arm 19 in cooperation with its associated adjustable guide 24 acts as a clamping means which serves to secure in place for cutting and splicing operations one end of the tube stock 26 while the camp arm 20 and its associated adjustable guide 25 form a clamping means to hold the other end of the tube stock 26.

Before the splicing operation can be performed in the apparatus, it is necessary to provide a freshly cut or tacky end on the tube stock 26 at the point where the ends are to be spliced together. To facilitate this operation, an anvil 27 is disposed between the carriages 6 and 7 for cooperation with the guide members 24 and 25, respectively, thereof during the cutting operation. The anvil 27 is adapted to be moved vertically into and out of position between the carriages 6 and 7 as by means of a piston rod 28 secured to suitable mechanism (not shown) for achieving this vertical motion.

As a precautionary measure and to prevent the tilting or irregular disposition of the segments 22 on the arms 19, 20 a guide bar 29 is fixed to the outermost face of each of the slide members 15 and 16 so as to project horizontally across the carriage 6, 7 and in generally parallel relation to the arm 19, 20 for contact with one of the upright portions of each of the several segments 22 as shown in Figs. 3 and 4. The guide bar 29 registers in the lowermost position of the slide members 15 and 16 with a vertically disposed element 30 secured to each of the movable carriages 6 and 7 to prevent the outermost ends of the clamp arms 19 and 20 from bending outward when the arms and their respective guide members 24 and 25 are moved together to bond the ends of the tube stock 26 due to the pressure exerted by the stock.

The adjustable guides 24 and 25 are substantially identical in construction and, as illustrated in Figs. 3 and 4, they each embody an abutment block 31 which is slidably mounted in the guideway 32 (see Fig. 3) for adjustable movement as by means of the screw 33. The screw 33 is actuated by the hand wheel 34 in a horizontal plane and in an axial direction with respect to the arms 19 and 20 with which the adjustable guides 24 and 25, respectively, are associated. The adjustment of the abutment block 31 of the adjustable guides 24, 25 enables the careful alignment of the tube stock ends 26 with respect to each other so as to insure a perfect splice when the ends are brought together subsequently.

The apparatus thus far described is concerned primarily with the clamping means for holding the tube stock 26 in place during the cutting and splicing operations performed by the splicing apparatus 1. The cutting operation is performed by another portion of the apparatus set in motion in properly timed sequence with the actuation of the slide members 15 and 16 and the horizontal motion of the carriages 6 and 7 as well as the vertical movement of the anvil 27. The operation of the several elements of the clamping mechanism and their association with the elements of the cutting apparatus will be more fully described hereinafter in connection with the description of the mode of operation of the apparatus.

The cutting element of the splicing apparatus 1 embodies a knife supporting arm 35 which is secured to or formed as a part of a slide member 36 supported in slidable relation to the upright portion 3 of the frame structure. The slidable mounting for the slide member 36 comprises the vertically disposed elements 37 and 38 secured to the upright portion 3 of the frame which cooperate to form a machine slide facilitating the desired vertical motion of the slide member 36 therebetween. A pair of vertically extending rods 39 are fixed to the uppermost end of the slide member 36 and carry a transversely disposed cross piece 40.

In the vertical movement of the slide member 36, the rods 39 are adapted to be slidable in a pair of clearance holes in a top plate 41 secured to the uppermost end of the upright portion 3 of the frame structure. Disposed between the rods 39 is a pneumatic cushion brake 42, the projecting end of plunger 43 of which is adapted to be contacted by the cross piece 40 mounted on the uppermost ends of the rods 39 when the slide member 36 carrying the rods approaches the lowermost extremity of its vertical motion. This cushion brake 42 acts to halt the descent of the slide member 36 and its arm 35 momentarily as they approach the lowermost extremity of their travel during the cutting operation. This stopping of the arm 35 will be explained in detail hereinafter.

The slide member 36 and its arm 35 are moved in their vertical path as by means of a pressure cylinder 44 which is provided with a piston rod 45 connected by suitable linkage 46 to the arm 35. The pressure cylinder 44 is supported in a vertical position, being suspended at its uppermost end from the top plate 41 as by means of the projecting boss 47 formed thereon. A plurality of studs 48 the uppermost end of each of which is threaded for the reception of the nuts 49 serve to suspend the knife support 50 from the horizontally projecting arm 35. The support 50 extends horizontally in generally parallel relation to the arm 35, but is spaced therefrom by means of a plurality of bosses 51 formed upon the under face of the arm.

The knife support 50 is provided internally and near the base thereof with a suitable electrical heating element 52 which extends lengthwise thereof. The heating element 52 serves to supply heat to the knives 53 and 54 adjustably secured to the knife support 50. The knives 53 and 54 are secured in place on the knife support 50 by means of a holding element 55 held in place by means of a plurality of set screws 56 inserted through the vertically slotted holes 57 in the holding element and corresponding holes 58 in the knife and threaded into the support 50. Each holding element 55 extends longitudinally of the knife support 50 and engages the uppermost edge of the knife 53, 54, thereby facilitating replacement and adjustment of the mounting of the knives without resorting to a complete dismantling of the supporting structure.

A limited amount of adjustment of the holding elements 55 is thus provided by the use of adjusting bolts 59 which are threaded through the lugs 60 formed on the arm 35. The ends of the bolts 59 contact the uppermost edges of the holding elements 55 which in turn contact the edges of the knives 53, 54. Thus, when the set screws 56 holding the knife blade 53, 54 are loosened slightly, the shifting of the holding element 55 by means of the bolts 59 will control the vertical position of the knife. After the adjustment of the holding elements 55 has been achieved, the lock nuts 61 on the bolts 59 are set against the under faces of the lugs 60, thereby preventing inadvertent shifting of the adjustment by a loosening of the bolts 59.

Supported between the knives 53 and 54 is a strip element 62 which extends parallel to the axis of the arm 35. The strip element 62 serves to support thereon a plurality of flat spring elements 63 in predetermined spaced relation. The flat spring elements 63 have at the ends thereof contact surfaces 64 which serve to establish initial contact with the curved edge portions of the tube stock 26 as the arm 35 approaches its lowermost position to enable the knives 53 and 54 supported thereby to cut through the ends of the tube stock. The strip element 62 is supported by means of a pair of vertically projecting rods 65 which extend in slidable relation through holes bored through the knife support 50 and the arm 35.

On the portion of each of the rods 65 extending above the arm 35 is disposed a compression spring 66 held in place by means of a cross plate 68 against an adjustment nut 67 threaded on the free end of the rod 65. The cross plate 68 is supported from a plate 69 which extends longitudinally of the arm 35 and is secured in place on bosses 70 by the studs 48 and the nuts 49 (Fig. 4) by means of the stud bolts 71 welded or brazed upon the plate 69. The cross plates 68 are held in place on the studs 71 by means of the nuts 72 threaded on the free ends of the studs.

The compression spring 66 in each instance is enabled to be adjusted to any desired degree of compression by the adjustment of the nuts 72 on the studs 71 or the nuts 67 on the rods 65 or both. Thus, the desired cushioning effect is provided when the strip element 62 and the flat springs 63 thereon are brought into contact with the tube stock 26 as the arm 35 and the knife support 50 carrying the knives 53 and 54 thereon are moved downwardly toward the lowermost extremity of their vertical motion. The pressure exerted upon the tube stock 26 by the flat springs 63 and the strip element 62 is thus enabled to be varied in the operation of the splicing apparatus to accommodate changes in the stock.

In the operation of the cutting element of the splicing apparatus 1, the strip element 62 carrying the flat springs 63 normally projects slightly below the cutting edges of the knives 53 and 54 to enable the contact surfaces 64 at the extremities of the flat springs to come into contact with the curved end portions of the tube stock 26. In this way, the material flattens out against the upper surface of the anvil 27 when the latter is in position between the carriages 6 and 7 for the performance of the cutting operation. The resilient support of the strip element 62 enables the passage of the knives 53 and 54 completely through the entire thickness of the tube stock 26 to insure complete severance of strips of the material from the ends of the tube stock. This operation provides a fresh tacky surface on the ends of the tube stock 26 to enable these ends, when brought together, to stick to each other temporarily until the vulcanizing operation serves to make the bond a permanent one.

The splicing apparatus 1 of the present invention is particularly advantageous in that it affords a vertical actuation of the clamping apparatus embodying the arms 19 and 20 for bringing the several segments 22 supported thereon into uniform contact with the material disposed upon the guides 24 and 25 to be spliced. As previously indicated herein, the conventional apparatus presently in use contemplates a pivotal mounting or jack-knife action of the clamping means, thereby causing at least certain of the individual segments on the clamping arm to contact portions of the material which is to be spliced before adjacent segments touch the remaining portions of the material. This action is particularly injurious to certain synthetic rubber compounds, particularly butyl rubber and the like, employed in the manufacture of inner tubes and the like in that the unevenness of the contact between the clamping elements of the material frequently causes pinching or cutting of the stock, thereby producing a defective product when the splice is completed.

The vertical operation of the clamping elements contemplated by the present invention obviates this difficulty since corresponding ones of the segments 22 on opposite sides of an intermediate point on the clamping arm 19 contact the material substantially simultaneously. In addition to the vertical clamping action of the arms 19 and 20, it is desired to provide means for adjustment of the extent of the vertical motion of the slide members 15 and 16. This adjustment is accomplished by the provision of an adjustment means 73 (see Figs. 5–8, inclusive) in which a cylindrical member 74 is threaded into a base 75 having fixed thereon a pointer 76 indicating the setting on a scale inscribed on the exposed periphery of the cylindrical member 74. The cylindrical member 74 and its base 75 are positioned in the opening 78 of the slide member 15 to enable the uppermost end of the cylindrical member 74 to contact the boss 79 formed internally of the opening 78.

A similar construction and corresponding elements are employed in adjustably controlling the extent of vertical movement of the slide member 16. Thus, the extent of movement of the slide members 15 and 16 in the vertical plane is restricted by the contact of the cylindrical member 74 with the boss portion 79. This adjustment insures against the exertion of excessive pressure by the clamping arms 19 and 20 against the tube stock 26 positioned on the guides 24 and 25, thereby preventing any possibility of pinching or damaging the material. It is well known that certain synthetic rubber stocks may be readily damaged by cutting or pinching due to excessive pressures being exerted thereon by reason of the fact that the stock is too soft in some instances to withstand such pressures.

In addition to the ability to adjust the vertical motion of the slide members 15 and 16, it is also possible to adjustably position the guide members 15 and 16 laterally with respect to the machine slides 17 and 18 on which they are mounted. This adjustment is provided to afford some lateral shifting of the arms 19 and 20 with respect to each other in a horizontal plane. Such adjustment is often necessary when, after long periods of use of the apparatus, it becomes necessary to grind down the stock contact surfaces 80 and toe portions 81 (see Fig. 3) of the several segments 22 supported by the arms 19 and 20. Thus, it is possible in this way to provide a somewhat longer life expectancy for the several segments 22, thereby avoiding frequent necessity of their complete replacement.

Such lateral adjustment of the slide members 15 and 16 is readily accomplished by means of the assembly 82 (see Fig. 9). The assembly 82, which provides the slidable mounting for slide members 15 and 16 with respect to the slides 17 and 18, respectively, embodies angle members 148 machined on the inner faces thereof to mate with corresponding machined faces on the slides. The angle members 148 are secured to the back of the slide member 15 by means of the socket head bolts 149. A socket head set screw 150 is secured to the angle member 148 and threaded into the projecting flange portion 151 of the slide member 15. After the proper lateral adjustment of the slide member 15 is achieved, the jam nuts 152 are tightened down against the outer face of the flange portion 151 to prevent inadvertent shifting of the slide member.

In the splicing of inner tubes, tread stock, and the like, the portion of the stock 26 intermediate the ends is temporarily supported on the saddle 83 mounted on the upright portion 3 of the machine frame as by means of the supports 84 secured to the vertically disposed elements 37 and 38. The conduit 85 carries the electrical wiring for supplying the necessary electrical energy to the heating element 52 in the knife support 50 for heating the knives 53 and 54.

It is desirable in the operations performed on the splicing apparatus 1 to be able to provide some reasonable range of adjustment for the horizontal movement of the carriages 6 and 7 on the bed 8 of the machine. To this end, the adjusting screw 86 (see Fig. 5) is provided on the under side of each carriage 6, 7 to control the extent of travel of the carriages. The adjusting screw 86 is threaded at one end into the block 87 secured to the stationary base portion 2 of the frame structure of the splicing apparatus 1 while the other end of the screw engages the internally threaded block 88 on the under side of each carriage 6, 7.

As will be readily understood from the detailed description of the method of operation of the splicing apparatus 1 hereinafter, it is essential to maintain a uniformly thick flash of stock about the periphery of the splice to insure best results. Thus, the toe portions 81 of the several segments 22 on the arms 19, 20 of the splicing apparatus 1 must be properly vertically aligned with the opposed cooperating faces of the guide members 24, 25 in the manner illustrated in Fig. 8. The adjustment screws 86 thus accomplish the lateral positioning of the carriages 6 and 7 while the previously described lateral adjustment of the slide members 15, 16 involving the use of the bolts 82 enables the several elements to be properly aligned as required.

The movement of the carriages 6 and 7 on the bed 8 of the base portion 2 of the splicing apparatus is effected by the linkages 89 and the vertically extending actuating means 90. The actuation of the several elements of the apparatus is achieved by a plurality of pressure cylinders or other prime movers (not shown) operating in the desired timed relation. The electrical circuit which forms no part of the present invention is energized to begin the cycle of operations performed by the splicing apparatus 1 when the operator simultaneously depresses both of the starting buttons 92, 93 (see Fig. 1).

In the operation of the splicing apparatus 1 for the manufacture of inner tubes and the like, the operator places a segment of tubular stock 26 over the saddle 83 with its open ends hanging downwardly. The open ends of the material are next brought into position with one end extending across the guide member 24 and the other end extending across the guide member 25. In production, the abutment block 31 is usually adjusted at the start of a given run of sizes and types of stock to insure that the ends of the stock 26 will be located substantially intermediate the over-all span of the arm 19 and the several segments 22 thereon.

Figure 5:
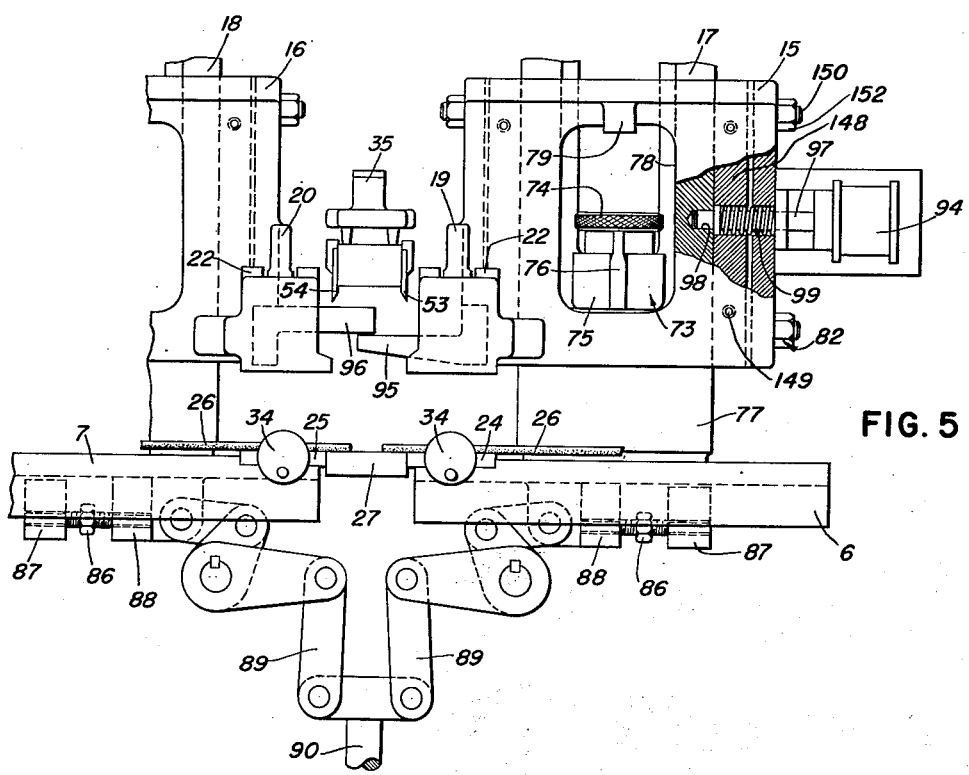

As will be noted from Fig. 4, when the guides 24, 25 are employed, the tube stock 26 is in its proper position when one edge thereof is against the abutment block 31. When the splicing apparatus 1 is ready for the start of a new cycle of operations, the carriages 6 and 7 and the anvil 27 are in their respective positions as illustrated in Fig. 5 to support the tube stock 26, the ends of which project slightly beyond the edges of the guides 24, 25 and onto the anvil.

The slide members 15 and 16 are in their uppermost positions on the machine slides 17 and 18, being held there against inadvertent lowering thereof as by means of the cooperative action of the core 97 of the solenoid 94 and the fingers 95, 96. The core 97 of the solenoid engages the socket 98 drilled in the wall of the machine slide 17 during the time the operator is putting the ends of the tube stock 26 in place preparatory to completing the splicing operation. These so-called safety features form no part of the present invention, but represent the subject matter of a co-pending George application, Serial No. 120,337 filed October 8, 1949.

After the tube stock 26 is in place on the guide members 24 and 25 and the ends thereof are properly aligned, the operator simultaneously presses the two starting buttons 92, 93. As a safety measure, the apparatus is so designed that it is necessary for the operator to place both hands on the starting buttons 92, 93 thereby removing his hands from the danger area beneath the clamping arms 19 and 20 and the knife arm 35. The electrical circuit is so constituted that the operator must keep the buttons 92, 93 depressed until after the pressure cylinders 9, 10 have operated to move the slide members 15, 16 with their clamping arms 19, 20, respectively, into their lowermost position in contact with the ends of the tube stock 26 and the top surface of guide members 24, 25.

Figure 6:
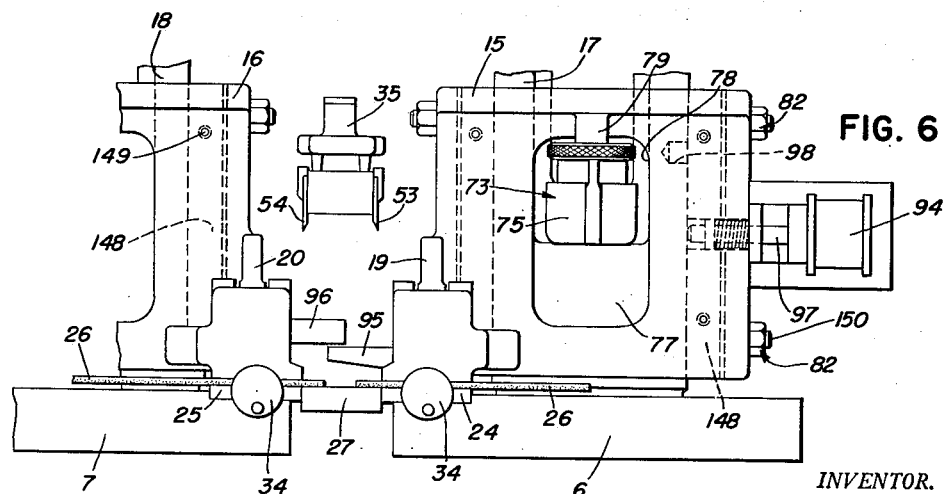

As will be noted from Fig. 4, the several segments 22 are so arranged on the arms 19, 20 that they will readily adjust themselves normal to the supporting enlarged portion 21 of the arms in such fashion that they approximate the contour of the stock 26. The guide bar 29 acts to prevent the several segments 22 from tilting or becoming misaligned with respect to the supporting enlarged portion 21. The airbag 23 is inflated substantially simultaneously with the downward movement of the arms 19, 20 so that the several segments 22 are urged downwardly by the pressure exerted against the bight of the segments by the airbag and into contact with the material to be spliced, thereby insuring a positive clamping action thereon. Thus, the second stage in the cycle of operations of the splicing apparatus 1 is illustrated in Fig. 6.

It will be noted that, when the operation of the apparatus is properly initiated, the core 97, by virtue of the energization of the solenoid 94, is disengaged from the socket 98 against the action of the compression spring 99. This operation frees the slide member 15 and its associated slide member 16 to begin their downward movement to clamping position. It is desirable that each of the cylindrical members 74 of the adjustment means 73 for the slide members 15 and 16 be adjusted first to insure that the lowermost extremity of the motion of the slide members is established before the splicing apparatus is started so as to prevent undue pinching of the tube stock 26 by the clamping action of the segments 22 on the clamp arms 19 and 20. This adjustment is accomplished by screwing the cylindrical member 74 into the base 75 of the adjustment means 73 to the extent desired as indicated by the scale measurements inscribed on the outer periphery of the cylindrical member.

After the segments 22 of the clamp arms 19 and 20 are in positive clamping contact with the ends of the tube stock 26, the knife supporting arm 35 is started downward by the pressure cylinder 44 which actuates the slide member 36 on which the arm is mounted. As the arm 35 descends, the cross piece 40 between the rods 39 carried by the slide member 36 comes into contact with the plunger 43 of the cushion brake 42 which momentarily stops the downward travel of the knives 53 and 54 as they start through the tube stock 26. This momentary halting of the knives 53 and 54 in the cutting operation serves to permit the stock to resume its normal shape after the original pressure due to the knife impact is relieved, thereby facilitating a clean cut. This third stage in the cycle of operations and the association of the several elements of the apparatus are illustrated in Fig. 7.

It should be noted in passing that after the knife supporting arm 35 is down, the operator may remove one or both hands from the starting buttons 92, 93 and the machine will continue through its complete cycle without additional initiation of the controls. However, should the operator remove even one hand from the starting buttons 92, 93 before the supporting arm 35 is down, the several slide members 15, 16 and 36 will return to their original positions as shown in Fig. 5 and will lock in place temporarily to permit the controls to complete their operation and return to starting relation. Thereafter, the operator may again start a new cycle provided he keeps both starting buttons 92, 93 depressed until the elements of the apparatus have assumed the operating positions of the third stage shown in Fig. 7.

With the ends of the stock 26 trimmed off by the cutting step of Fig. 7, the anvil 27 is next retracted, an air blast is directed across the face of the anvil 27 and the trimmed stock is blown into a suitable receptacle (not shown) in the base portion 2 of the frame structure of the splicing apparatus 1. The knife supporting arm 35 is simultaneously moved to the uppermost extremity of its path. In predetermined timed relation to these operations, the carriages 6 and 7 are moved horizontally of the bed 8 toward each other with the ends of the tube stock 26 still held securely in place, thereby enabling the freshly cut tacky ends to be jammed together to produce a temporary bond between the stock ends as will be seen in Fig. 8.

As previously indicated, the apparatus illustrated in Fig. 10 represents a modification of the clamping means and guide mechanism capable of advantageous employment with the splicing apparatus 1. The clamping arm 100 which corresponds generally to the clamping arm 19 of the apparatus as illustrated in Fig. 3 has an enlarged portion 101 to the uppermost machined surface of which is secured a tapered, wedge-shaped member 102 as by means of a plurality of dowel pins 103. This tapered, wedge-shaped member 102 serves to support the several U-shaped segments 104 in the manner illustrated in Fig. 10 with those segments adjacent the ends of the arm 100 extending progressively lower than those segments intermediate the ends of the arm.

Thus, it will be seen that when clamping arm 100 is lowered and the airbag 105 disposed internally of the segments 104 and extending between the lowermost face of the enlarged portion 101 and the bight of the U-shaped segments is inflated as by means of air pressure through the inlet connection 106, certain of those segments in the areas A, A will be caused to contact the outermost edges of the material to be spliced before those segments extending over the central portion B of the tapered element 102 contact the stock 26. It is to be noted that the outermost ones of the several segments 104 at opposite ends of the arm 100 will contact the folded edges at points C, C on the stock 26 simultaneously when the arm 100 is disposed in the dotted line position D—D. This form of clamping mechanism has been found to possess certain advantages with various types and classes of material which are to be spliced together by the splicing apparatus 1.

When the clamping mechanism embodying the arm 100 is employed, it is desirable to supply a somewhat different form of guide means such, for example, as that identified by the reference character 107 in Fig. 10. The guide means 107 embodies the principle of adjustably positioning the material to be spliced in proper axial relation with respect to the arm 100. Thus, the pair of guide means 107 insures that the outermost folds C, C of the material will be contacted by corresponding ones of the several segments 104 in the areas A, A as the arm 100 is moved downwardly into contact with the material.

The guide means 107 comprises a casting 108 having a pair of guideways 109 and 110 extending therethrough in the manner shown in Fig. 10. A pair of blocks 111 and 112 are mounted in the guideways 109 and 110, respectively, for reciprocatory motion in the manner hereinafter to be described. The blocks 111 and 112 have mounted on the uppermost surface thereof plates 113 and 114 which incorporate guide elements 115 and 116. The plates 113 and 114 are secured to the face of the blocks 111 and 112 as by means of the dowel pins 117 and 118, respectively.

The blocks 111 and 112, with their respective plates 113 and 114, are so constructed that they cooperate to threadably engage a shaft 119 having a knurled hand wheel 120 on one end thereof for acuating the elements longitudinally of the guideways 109 and 110 over the ranges of a scale 121 marked on the uppermost face of the casting 108 of the guide means 107. The threaded portions 122 and 123 on the shaft 119 serve to move the blocks 111 and 112 with their respective plates 113 and 114 toward and away from each other in the guideways 109 and 110 as the hand wheel 120 is manipulated, the space between any given setting of the guide elements 115 and 116 being indicated upon the scale 121 as the elements are moved.

The shaft 119 is suspended from the under side of the casting 108 by its engagement in the blocks 111 and 112 as well as by means of the bearing plate 124 secured in place on the machined face 125 on the under side of the casting 108 as by means of the socket head machine screws 126 which are adapted to be countersunk into the uppermost face of the casting 108 in the manner shown in Fig. 10. A crossbar 127 formed in the casting 108 is provided with a milled groove 128 extending from end to end thereof for the reception of an enlarged portion 129 formed on the shaft 119 and disposed in a position equidistant from the ends of the threaded portions 122 and 123 on the shaft. The endwise relation of the enlarged portion 129 with respect to the casting 108 is readily achieved by the insertion of the accurately machined washers 130 and 131 on opposite sides of the enlarged portion 129 providing a bearing mounting for the portion in the milled groove 128 in the cross bar 127.

In this fashion, it is possible to adjust accurately within reasonable limits the endwise position of the shaft 119 so as to insure the proper adjustability of the guide elements 115 and 116 with respect to each other as well as to the scale 121 on the face of the casting 108 when the parts are assembled. The certainty of proper alignment of the ends of the tube stock 26 with respect to the vertical axis of the clamp arm 100 is readily assured.

As the apparatus is illustrated in Fig. 10, the guide means 107 represents the element of the apparatus mounted upon the carriage 7 which, as will be noted from Fig. 1 of the drawings, is the left hand carriage as the operator faces the machine. An identical guide means will be mounted upon and associated with the right hand carriage 6, thereby enabling the careful and simultaneous endwise alignment of the end portions of the tube stock 26 as it is positioned upon the carriages 6 and 7 for the performance of the operations hereinbefore described to accomplish the splicing of the ends of the material together.

The guide means 107 is illustrated in Fig. 10 as being located upon the left hand carriage 7 by means of an abutment 132 capable of insertion in a bore 133 in the uppermost face of the carriage. The abutment 132 serves to hold the guide means 107 in place at all times with respect to the carriage 6, 7 as it is moved in a horizontal plane over the bed 8 of the base portion 2 of the splicing apparatus 1. It will be readily understood from the foregoing that the two guides 107 on the carriages 6 and 7 of the apparatus will be independently adjustable by means of hand wheels 120. Thus, it is necessary for the operator to note on the scale 121 the span of each set of the guide elements 115 and 116 to facilitate the proper alignment of the ends of the tube stock 26 preparatory to their being spliced in the splicing apparatus 1.

One of the principal advantages of the form of clamping means and guide means illustrated in Figs. 9, 10, and 11 of the drawings is that the several segments 104 on the clamp arm 100 in the areas A, A, as the arm moves downward, tend to cause the folds C, C in the stock 26 to be pressed downward and outward toward the spaces E, E adjacent the guide elements 115 and 116 of the guide means 107. This action serves to introduce a slight stretch in the intermediate portion F of the tube stock 26 and to work the folds C, C into flattened form virtually eliminating any possibility of pinching of the stock. Moreover, the positive clamping action achieved greatly facilitates the cutting and bonding operations.

The modification of the invention illustrated in Figs. 13 and 14 of the drawings employs a pair of guide means 134 and 135 which correspond generally in their construction to that previously described in connection with the pair of right and left hand guide means 107. It is contemplated that the guide means 134 and 135 will be associated respectively with the carriages 6 and 7 of the splicing apparatus 1 as before. As indicated above in the description of the guide means 107, it is essential that the operator carefully note the relative positions of each set of guide elements 115 and 116 of the two guide means disposed on each of the carriages 6 and 7 in order to be assured that the ends of the tube stock 26 will be properly aligned for the splicing operation. In the apparatus illustrated in Figs. 13 and 14, however, the simultaneous positive alignment of the guide elements 136 and 137 of the guide means 134 and 135, respectively, will be accomplished by means of the cross shaft 138 actuated by the hand wheels 139, thereby avoiding any possibility of the incorrect positioning of one or the other of the sets of guide elements.

The cross shaft 138 is supported from the under side of the guide means 134 and 135 by means of bearing brackets 140 secured to the guide means by a plurality of socket head screws 141 countersunk into the upper face of the guide means. The cross shaft 138 carries thereon a pair of spaced spiral gears 142 for meshing engagement with a similar spiral gear 143 on the outermost end of each of the shafts 144 and 145 of the guide means 134 and 135, respectively. Thus, it is possible with the apparatus of Figs. 13 and 14, for the operator by the simple manipulation of the hand wheel 139 to simultaneously adjust the sets of guide elements 136 and 137 of the guide means 134 and 135, thereby insuring the proper alignment of the ends of the tube stock 26 on the carriages 6 and 7 of the splicing apparatus 1.

It will be noted that the gears 142 are mounted upon the cross shaft 138 in such fashion that when the guide means 134 and 135 are moved toward and away from each other as the carriages 6 and 7 are shifted, the gears 142 will be free to slide laterally. This mounting is accomplished by the use of the axially extending groove 146 cut in the cross shaft 138. The key 147 serves to secure the gears 142 in place and registers with the groove 146 to permit freedom of lateral movement of the guide means 134 and 135 although the cross shaft 138 is stationary.

While certain representative embodiments and details have been shown for the purpose of illustrating the invention, it will be apparent to those skilled in this art that various changes and modifications may be made therein without departing from the spirit or scope of the invention.

One modification which may advantageously be incorporated in the apparatus is the abutment means 148 secured to the uppermost face of the anvil 27 as illustrated in Figs. 13 and 14. This abutment means 148 which takes the form of a strip or plate of predetermined width provides a stop against which the ends of the tube stock 26 are butted to insure an equal amount of trim in the cutting operation from both ends of the tube stock. Thus, the resulting length of the spliced tubes will be more uniform.

I claim:

1. In tube splicing apparatus, clamping means for supporting and holding the ends of the stock to be spliced, each of said clamping means comprising a carriage mounted for shiftable movement in a horizontal plane; a pressure member for engaging an end of the stock supported by the carriage; a slide member supporting said pressure member for shiftable movement in a vertical plane; means for shifting the slide member toward and away from the carriage; means for moving the slide members and the carriage simultaneously in a horizontal plane when said carriage and said pressure member are in clamping position; and an adjustable stop for defining at least one of the limits of the vertical movement of the slide members.

2. In tube splicing apparatus, clamping means for supporting and holding the ends of the stock to be spliced, said clamping means comprising a pair of carriages mounted for mutually shiftable movement in a horizontal plane; a pressure member for each carriage, said pressure member embodying a plurality of self-adjusting stock-contacting elements and means releasably urging the elements into contact with the stock and said carriage; slide members supporting said pressure members for shiftable movement in a vertical plane; means for shifting the slide members toward and away from the carriages; and means for moving the slide members and the carriages coacting therewith simultaneously in a horizontal plane when said carriages and said pressure members are in a clamping position 3. In tube splicing apparatus, clamping means for supporting and holding the ends of the stock to be spliced, said clamping means comprising a pair of carriages mounted for shiftable movement in a horizontal plane toward and away from each other; a pressure member associated with each carriage for engaging an end of the stock supported by the carriage, said pressure member embodying an arm, a plurality of stock-contacting elements slidably mounted on the arm for conforming to the shape of the stock and the carriage on contact therewith and means releasably urging the elements into contact with the carriage and the stock disposed thereon; slide members supporting said pressure members for shiftable movement in a vertical plane; means for shifting the slide members toward and away from the carriage; and means for moving the slide members and the carriages coacting therewith simultaneously in a horizontal plane when said carriages and said pressure members are in a clamping position.

4. In tube splicing apparatus, clamping means for supporting and holding the ends of the stock to be spliced, each of said clamping means comprising a carriage mounted for shiftable movement in a horizontal plane; a pressure member for engaging an end of the stock supported by the carriage, said pressure member being mounted for shiftable movement in a vertical and in a horizontal plane; means for shifting the pressure members vertically toward and away from the carriage; means for moving the pressure members and the carriages simultaneously in a horizontal plane when said pressure members and said carriages are in clamping position; and an adjustable stop for defining at least one of the limits of the vertical movement of the pressure members.

5. In tube splicing apparatus, clamping means for supporting and holding the ends of the stock to be spliced, said clamping means comprising a pair of carriages mounted for shiftable movement in a horizontal plane toward and away from each other; a pressure member associated with each carriage for engaging an end of the stock supported by the carriage; a slide member supporting each of the pressure members for shiftable movement in a vertical plane; an adjustable stop for defining at least one of the limits of the vertical movement of each of the slide members; means for shifting the slide members toward and away from the carriages; and means for moving each slide member and its associated carriage simultaneously in a horizontal plane when its carriage and said pressure member are disposed in a clamping position.

6. In tube splicing apparatus, clamping means for supporting and holding the ends of the stock to be spliced, each of said clamping means comprising a carriage mounted for shiftable movement in a horizontal plane; a pressure member for engaging an end of the stock supported by the carriage, said pressure member being mounted for shiftable movement in a vertical and in a horizontal plane; means for shifting the pressure member vertically toward and away from the carriage; means for moving the pressure member and the carriage simultaneously in a horizontal plane when the pressure member and the carriage are in clamping position; a pair of guides on said carriage for adjustably positioning the stock; and means for shifting the guides with respect to each other.

7. In tube splicing apparatus clamping means for supporting and holding the ends of the stock to be spliced, said clamping means comprising a pair of carriages mounted for shiftable movement in a horizontal plane toward and away from each other; a pressure member associated with each carriage for engaging an end of the stock supported by the carriage; a slide member supporting each of the pressure members for shiftable movement in a vertical plane; ways defining the path of vertical motion of the slide members; means on the ways for adjustably positioning the slide members with respect thereto; means for shrifting the slide members toward and away from the carriages; and means for moving each slide member and its associated carriage simultaneously in a horizontal plane when said carriage and its pressure member are in a clamping position.

8. In tube splicing apparatus, clamping means for supporting and holding the ends of the stock to be spliced, said clamping means comprising a pair of carriages; means for supporting the carriages for shiftable movement in a horizontal plane; means on said carriages and said supporting means for selectively adjusting at least one of the extremities of the horizontal movement of the carriages; a pressure member associated with each carriage for engaging an end of the stock supported by the carriage; a slide member supporting each of the pressure members for shiftable movement in a vertical plane; means for shifting the slide members toward and away from the carriages; and means for moving each slide member and the supporting means on which its associated carriage is mounted simultaneously in a horizontal plane when said carriage and its pressure member are in a clamping position.

9. In tube splicing apparatus, clamping means for supporting and holding the ends of the stock to be spliced, said clamping means comprising a pair of carriages; means for supporting the carriages for shiftable movement in a horizontal plane; means on said carriages and said supporting means for selectively adjusting at least one of the extremities of the horizontal movement of the carriages; a pressure member associated with each carriage for engaging an end of the stock supported by the carriage; a slide member supporting each of the pressure members for shiftable movement in a vertical plane; ways defining the path of vertical motion of the slide members; means on the ways for adjustably positioning the slide members with respect thereto; means for shifting the slide members toward and away from the carriages; and means for moving each slide member and the supporting means on which its associated carriage is mounted simultaneously in a horizontal plane when said carriage and its pressure member are in a clamping position.

10. In tube splicing apparatus, clamping means for supporting and holding the ends of the stock to be spliced, said clamping means comprising a pair of carriages; means for supporting the carriages for shiftable movement in a horizontal plane; means on said carriages and said supporting means for selectively adjusting at least one of the extremities of the horizontal movement of the carriages; a pressure member associated with each carriage for engaging an end of the stock supported by the carriage; a slide member supporting each of the pressure members for shiftable movement in a vertical plane; an adjustable stop for defining at least one of the limits of the vertical movement of each of the slide members; ways defining the path of vertical motion of the slide members; means on the ways for adjustably positioning the slide members with respect thereto; means for shifting the slide members toward and away from the carriages; and means for moving each slide member and the supporting means on which its associated carriage is mounted simultaneously in a horizontal plane when the carriage and its pressure member are in a clamping position.

11. In tube splicing apparatus, clamping means for supporting and holding the ends of the stock to be spliced, said clamping means comprising a pair of carriages mounted for shiftable movement in a horizontal plane toward and away from each other; a pressure member associated with each carriage for engaging an end of the stock supported by the carriage; a guide on each carriage for adjustably positioning the ends of the stock to be spliced with respect to the pressure members; at least one abutment shiftably mounted on each of the guides for adjustment in a plan normal to the plane of movement of the carriage; a slide member supporting each of the pressure members for shiftable movement in a vertical plane; means for shifting the slide members toward and away from the carriages; and means for moving each slide member and its associated carriage simultaneously in a horizontal plane when the carriage and its pressure member are in a clamping position.

12. In tube splicing apparatus, clamping means for supporting and holding the ends of the stock to be spliced, said clamping means comprising a pair of carriages mounted for shiftable movement in a horizontal plane toward and away from each other; a pressure member associated with each carriage for engaging an end of the stock supported by the carriage; a guide on each carriage; a pair of abutments on each of the guides for adjustably positioning the ends of the stock with respect to the pressure members, said abutments being shiftable in a plane normal to the plane of movement of the carriages; a screw for concomitantly moving both pairs of abutments toward and away from each other to insure proper alignment of the stock ends; a slide member supporting each of the pressure members for shiftable movement in a vertical plane; means for shifting the slide members toward and away from the carriages; and means for moving each slide member and its associated carriage simultaneously in a horizontal plane when the carriage and its pressure member are in a clamping position.

13. In tube splicing apparatus, clamping means for supporting and holding the ends of the stock to be spliced, said clamping means comprising a pair of carriages mounted for shiftable movement in a horizontal plane toward and away from each other; a pressure member associated with each carriage for engaging an end of the stock supported by the carriage; a guide on each carriage; a pair of abutments on each of the guides for adjustably positioning the ends of the stock with respect to the pressure members, said abutments being shiftable in a plane normal to the plane of movement of the carriages; a screw for concomitantly moving both pairs of abutments toward and away from each other to insure proper alignment of the stock ends; a slide member supporting each of the pressure members for shiftable movement in a vertical plane; ways defining the path of vertical motion of the slide members; means on the ways for adjustably positioning the slide members with respect thereto; means for shifting the slide members toward and away from the carriages; and means for moving each slide member and its associated carriage simultaneously in a horizontal plane when the carriage and its pressure member are in a clamping position.

14. In tube splicing apparatus, clamping means for supporting and holding the ends of the stock to be spliced, said clamping means comprising a pair of carriages; means for supporting the carriage for shiftable movement in a horizontal plane; means on said carriage and said supporting means for selectively adjusting at least one of the extremities of the horizontal movement of the carriages; a pressure member associated with each carriage for engaging an end of the stock supported by the carriage; a guide on each carriage; a pair of abutments on each of the guides for adjustably positioning the ends of the stock with respect to the pressure members, said abutments being shiftable in a plane normal to the plane of movement of the carriages; a screw for concomitantly moving both pairs of abutments toward and away from each other to insure proper alignment of the stock ends; a slide member supporting each of the pressure members for shiftable movement in a vertical plane; means for shifting the slide members toward and away from the carriages; and means for moving each slide member and the supporting means on which is mounted its associated carriage simultaneously in a horizontal plane when the carriage and its pressure member are in a clamping position.

15. In tube splicing apparatus, clamping means for supporting and holding the ends of the stock to be spliced, said clamping means comprising a pair of carriages; means for supporting the carriages for shiftable movement in a horizontal plane; means on said carriages and said supporting means for selectively adjusting at least one of the extremities of the horizontal movement of the carriages; a pressure member associated with each carriage for engaging an end of the stock supported by the carriage; a guide on each carriage; a pair of abutments on each of the guides for adjustably positioning the ends of the stock with respect to the pressure members, said abutments being shiftable in a plane normal to the plane of movement of the carriages; a screw for concomitantly moving both pairs of abutments toward and away from each other to insure proper alignment of the stock ends; a slide member supporting each of the pressure members for shiftable movement in a vertical plane; ways defining the path of vertical motion of the slide members; means in the ways for adjustably postioning the slide members with respect thereto; means for shifting the slide members toward and away from the carriages; and means for moving each slide member and the supporting means on which is mounted its associated carriage simultaneously in a horizontal plane when the carriage and its pressure member are in a clamping position.

16. In tube splicing apparatus, clamping means for supporting and holding the ends of the stock to be spliced, said clamping means comprising a pair of carriages; means supporting the carriages for shiftable movement in a horizontal plane; means on said carriages and said supporting means for selectively adjusting at least one of the extremities of the horizontal movement of the carriages; a pressure member associated with each carriage for engaging an end of the stock supported by the carriage; a guide on each carriage; a pair of abutments on each of the guides for adjustably positioning the ends of the stock with respect to the pressure members, said abutments being shiftable in a plane normal to the plane of movement of the carriages; a screw for concomitantly moving both pairs of abutments toward and away from each other to insure proper alignment of the stock ends; a slide member supporting each of the pressure members for shiftable movement in a vertical plane; ways defining the path of vertical motion of the slide members; means in the ways for adjustably positioning the slide members with respect thereto; an adjustable stop for defining at least one of the limits of the vertical movement of each of the slide members; means for shifting the slide members toward and away from the carriages; and means for moving each slide member and the supporting means on which is mounted its associated carriage simultaneously in a horizontal plane when the carriage and its pressure member are in a clamping position.

EVERETT D. GEORGE.

REFERENCES CITED

The following references are of record in the file of this patent:

UNITED STATES PATENTS

| Number | Name | Date |
|---|---|---|
| 869,105 | Schmalz et al. | Oct. 22, 1907 |
| 991,710 | Flugstad et al. | May 9, 1911 |
| 1,511,298 | Petzold | Oct. 14, 1914 |
| 2,024,577 | Haase | Dec. 17, 1935 |
| 2,040,466 | Christy | May 12, 1936 |
| 2,186,286 | Engler et al. | Jan. 9, 1940 |
| 2,254,596 | Breth et al. | Sept. 2, 1941 |
| 2,273,464 | Campbell et al. | Feb. 17, 1942 |